(12) United States Patent
Bertocchi

(10) Patent No.: US 9,814,254 B2
(45) Date of Patent: Nov. 14, 2017

(54) APPARATUS FOR ENZYMATIC INACTIVATION OF PUREE, OR JUICE, OBTAINED BY VEGETABLE OR ANIMAL FOOD, AND APPARATUS THEREOF

(76) Inventor: Alessandro Bertocchi, Parma (IT)

(*) Notice: Subject to any disclaimer, the term of this patent is extended or adjusted under 35 U.S.C. 154(b) by 1149 days.

(21) Appl. No.: 13/820,202

(22) PCT Filed: Sep. 1, 2011

(86) PCT No.: PCT/IB2011/002019
§ 371 (c)(1),
(2), (4) Date: May 8, 2013

(87) PCT Pub. No.: WO2012/028946
PCT Pub. Date: Mar. 8, 2012

(65) Prior Publication Data
US 2013/0220146 A1  Aug. 29, 2013

(30) Foreign Application Priority Data
Sep. 1, 2010 (IT) .............................. PI2010A0101

(51) Int. Cl.
| | | |
|---|---|---|
| A23N 1/00 | (2006.01) | |
| A23L 1/212 | (2006.01) | |
| A23B 7/06 | (2006.01) | |
| A23L 2/02 | (2006.01) | |
| A23L 3/22 | (2006.01) | |
| A23N 1/02 | (2006.01) | |
| A23N 12/04 | (2006.01) | |
| A23L 2/04 | (2006.01) | |
| A23L 19/00 | (2016.01) | |

(52) U.S. Cl.
CPC .............. *A23L 1/2128* (2013.01); *A23B 7/06* (2013.01); *A23L 2/02* (2013.01); *A23L 2/04* (2013.01);
(Continued)

(58) Field of Classification Search
CPC ........ A23L 19/09; A23L 3/225; A23L 1/2128; A23B 7/06; A23N 1/02; A23N 12/04; A23N 1/00
(Continued)

(56) References Cited

U.S. PATENT DOCUMENTS 4,095,517 A * 6/1978 Janovtchik ............... A23N 1/00
366/196
4,643,085 A 2/1987 Bertocchi
(Continued)

FOREIGN PATENT DOCUMENTS

EP 0850 572 A2 7/1998
EP 2 022 342 A1 2/2009
(Continued)

OTHER PUBLICATIONS

International Search Report dated Feb. 6, 2012 for Application No. PCT/IB2011/002019.
espacenet English abstract of FR 2 517 934 A1.

*Primary Examiner* — Ghassem Alie
*Assistant Examiner* — Nhat Chieu Do
(74) *Attorney, Agent, or Firm* — Ladas & Parry LLP

(57) ABSTRACT

An apparatus for enzymatic inactivation of puree, or juice, from vegetable or animal food, having a treatment section of food of vegetable origin obtaining a treated product. The treated product exiting from the treatment section is directed towards an extraction section. The treated product enters the extraction section at a temperature $T_0$. The apparatus also has a storage and recirculation section having an enzymatic inactivation circuit crossed by a hot product at a temperature $T_2$ normally about 85° C.-90° C. The main product present in the extraction section is struck, near the sieve, or directly on its surface, by a flow of hot product coming from the enzymatic inactivation section. The mixture so obtained in the extraction section has at least one part of inactivated product and is then discharged through an outlet.

12 Claims, 6 Drawing Sheets

(52) U.S. Cl.
CPC ............... *A23L 3/225* (2013.01); *A23L 19/09* (2016.08); *A23N 1/00* (2013.01); *A23N 1/02* (2013.01); *A23N 12/04* (2013.01)

(58) Field of Classification Search
USPC ............. 99/452, 453, 451, 483; 210/87, 787
See application file for complete search history.

(56) References Cited

U.S. PATENT DOCUMENTS

| | | | |
|---|---|---|---|
| 5,283,078 A | 2/1994 | Bertocchi | |
| 5,632,907 A * | 5/1997 | Norbury | B01D 29/23 100/117 |
| 6,536,602 B2 * | 3/2003 | Ruescher | B01D 29/356 100/117 |
| 2004/0045451 A1 * | 3/2004 | Bertocchi | A23L 19/09 99/485 |
| 2008/0000500 A1 * | 1/2008 | Bertocchi | B07B 1/20 134/33 |

FOREIGN PATENT DOCUMENTS

| | | |
|---|---|---|
| FR | 2 517 934 A1 | 6/1983 |
| WO | 02/058489 A2 | 8/2002 |
| WO | 03/034843 A1 | 5/2003 |
| WO | 2010/070437 A1 | 6/2010 |

* cited by examiner

APPARATUS FOR ENZYMATIC INACTIVATION OF PUREE, OR JUICE, OBTAINED BY VEGETABLE OR ANIMAL FOOD, AND APPARATUS THEREOF

FIELD OF THE INVENTION

The present invention relates to the food industry and, in particular, it relates to a process for enzymatic inactivation of puree, or juice, obtained from vegetable or animal food.

The invention relates, furthermore, to an apparatus that carries out this process.

DESCRIPTION OF THE PRIOR ART

As well known, the industrial extraction of juice and puree from vegetable products, fruit and vegetables, is effected by rotating machines, such as rough and finishing extractors, comprising a rotor having radial blades that operates in combination with a fixed sieve having cylindrical or conical shape, obtaining the separation of the main product, i.e. the juice, or the puree, from the part to dispose of, mainly seeds, skins and stems.

The energy necessary for the extraction is supplied by a motorized impeller, or rotor, which puts in rotation the ground product in the sieve applying to it a centrifugal force necessary to cause the passage of the product through the holes of the sieve. In this way, the liquid part of the product, i.e. the juice, and/or the solid but homogeneous part, i.e. the puree, are filtered through the holes and conveyed in order to be successively subjected to further treatments. The solid parts which do not pass through the sieve, the so-called waste products, move axially from the opposite side of the inlet and are automatically conveyed to an outlet of the waste. See for example IT1199392.

A known process of this kind is the extraction at room temperature, also-called "cold extraction", which is carried out in two steps: a first step for cutting and/or softening the pulps, for example carried out by a plurality of pulses in quick succession (see IT1249363) and a second step for separating in the extractor the part that can be used, i.e. the juice and the puree, from the waste solid parts. The puree extracted at room temperature is then heated, usually very quickly into an inactivation plant, for stopping the enzymatic activity and stabilizing it. The product obtained with this process has a fresh taste similar to that of the fruit, or of the vegetable, and a bright colour.

The enzymatic inactivation plants of known type, however, perform the enzymatic inactivation of the puree, or the juice, coming from the extractor, or from the finishing extractor, in a relatively long time. This can jeopardize the enzymatic inactivation process and cause an early deterioration of the product.

Another drawback of the plants, of known type, for the extraction and successive enzymatic inactivation of puree and juice, is that, after a certain period of operation of the extracting machine, the outer side of the sieve is covered by a layer of, more or less thick, puree which adheres to the surface causing a partial, or total, clogging of the holes. This phenomenon, which is, in most of the products, substantially negligible at the starting stage of the extraction, tends to gradually increase towards the final stage, not only because the juice, which is more liquid, filters quickly while the puree, which has an higher viscosity, encounters an higher resistance to pass through the holes, but also because the high viscosity of the puree avoids its sliding on the outer surface of the sieve. Therefore, the puree does not fall and form lumps on the external wall of the sieve, causing in this way the clogging of the holes and a reduction of the efficiency of the machine. Therefore, it is necessary to periodically remove the layer of puree that is thickened out of the sieve in order to restore the conditions of full efficiency of the machine.

To this purpose, different mechanical or hydraulic devices have been designed and made, which act on the layer that is adhered to the outside of the sieve by means of scrapers, brushes, or water jets, to remove such layer and cause it to fall down.

In WO2010/070437 an extraction process of puree, or juice, from a starting product, which is based on vegetable or animal food, is described comprising an initial treatment step, for example a softening step, of the food product obtaining a treated product. A deviation step follows, during which the treated product is selectively directed towards a process of "cold extraction", or alternatively towards a process of "hot extraction". If the treated product is directed towards the process of cold extraction, it is first subjected to an extraction step, in which the entering product is separated into a main product comprising the puree, or the juice, and into a waste product. The main product is, then, subjected to a step of enzymatic inactivation inside of an enzymatic inactivation section through a quick heating of the product exiting from the extraction section up to a predetermined temperature T. Instead, if the treated product is directed towards the hot extraction process, it is firstly subjected to a step of enzymatic inactivation and then subjected to an extraction step from which the main product and the waste product derive. In both cases, i.e. both in the case of hot extraction and in the case of cold extraction, the whole product, i.e. containing peelings, skins and other parts of waste, respectively heat, or cold, is fed in the sieve and subjected to an extraction step. Even though the machine and the process are, in this case, flexible, since it is possible to provide a hot extraction, or a cold extraction, with a same plant, also in this case, there are long residence times of the product in the enzymatic inactivation section. Furthermore, it is necessary to remove with water, or other substances, the product that adheres on the sieve of the extraction section. Then, also in the case of the machine and the process described in WO2010/070437, it is possible to affect the taste of the final product both for the long residence times of the product in the inactivation section and for the need of washing the sieve.

In WO02/058489 an apparatus is described for de-aeration of puree, or juice, comprising an extractor, or a fine extractor and a de-aerator. The product exiting the extractor, or the finishing extractor, is fed into the de-aerator to obtain a de-aerated product that is then sent to an enzymatic inactivation section.

In FR2517934 a process for enzymatic inactivation of fruit and vegetables is described comprising a step of grinding the product and of putting it in an enzymatic inactivation section where it is mixed with a heated product present in it.

SUMMARY OF THE INVENTION

It is therefore a feature of the present invention to provide a process for enzymatic inactivation of puree, or juice, obtained from vegetable or animal food for minimizing the residence time of the product, i.e. puree and/or juice, at the enzymatic inactivation temperature.

It is also a feature of the present invention to provide a production process for puree, or juice, obtained from vegetable or animal food, which allows to remove possible residues of puree adhered to the surface of the sieve of the machine used to provide the extraction of the puree, or the juice, from the starting vegetable, or animal, product.

It is, furthermore, a feature of the present invention to provide an extraction apparatus of puree, or juice, obtained from vegetable or animal food and its enzymatic inactivation with the same above advantages.

These and other objects are achieved by an apparatus, according to the invention, for enzymatic inactivation of puree, or juice, obtained from vegetable food, comprising:
- a treating section, for treating said vegetable food obtaining a treated product;
- an extraction section in which a rotor is arranged to work in combination with a fixed sieve having a plurality of holes, in order to separate the treated product into a main product comprising said puree, or juice, which passes through said sieve and is discharged through a first outlet, and into a waste material, which, instead, cannot pass through said sieve and is discharged through a second outlet;
- an enzymatic inactivation section arranged downstream of said extraction section, said enzymatic inactivation section comprising a heating means that is arranged to transmit to the main product a predetermined thermal power Pt for causing an enzymatic inactivation of the main product;
- a means for causing at least a beginning of said step of enzymatic inactivation in said extraction section, said means for causing arranged to transfer said predetermined thermal power Pt to said main product for causing said enzymatic inactivation for at least one part of said main product before said main product is discharged by said extraction section through said first outlet;

whose main feature is that said means for causing at least a beginning of said enzymatic inactivation comprises a mixing means, in the extraction section, for mixing the main product with a predetermined amount of hot product coming from the enzymatic inactivation section and delivered in said extraction section, such that said amount of hot product causes at least in part an enzymatic inactivation of said main product.

In particular, the hot product and the main product are provided in the extraction section in a predetermined amount such that the exchange of thermal power that is carried out during their mixing causes an enzymatic inactivation at least in part of the main product.

In particular, the flow of hot product put in the extraction section and the flow of main product, i.e. the amount of main product extracted in the unit of time, are in a predetermined ratio such that the exchanged thermal power during the mixing step causes an enzymatic inactivation at least in part of said main product.

In particular, the hot product is the main product, i.e. puree and/or juice, coming from the extraction section where it is kept at a temperature higher, or equal, to the enzymatic inactivation temperature. The thermal power Pt of the hot product is such that, when the hot product is mixed with the cold main product, in the extraction section, the hot product causes at least one partial enzymatic inactivation of the cold main product.

Preferably, the conveying means of the flow of hot product, from the enzymatic inactivation section to the extraction section, comprises a feeding means for feeding the flow of hot product out of the sieve, i.e. at the opposite side of the flow of product to be submitted to the extraction step.

Advantageously, the mixing means comprises a feeding means for feeding a flow of hot product on the surface of the sieve in order to transfer said predetermined thermal power Pt to said main product directly on the outer surface of the sieve, or near the outer surface of the sieve.

In particular, the enzymatic inactivation section comprises an enzymatic inactivation circuit having recirculation means. The recirculation means is adapted to cause the recirculation of the main product in said circuit for a predetermined time above the enzymatic inactivation temperature, where the mixing means draws the above described predetermined amount of hot product that flows in the circuit for feeding it in the extraction section.

In a first exemplary embodiment, the mixing means is arranged to withdraw the predetermined amount of hot product from the enzymatic inactivation section and to feed it in the extraction section, in such a way to transfer a thermal power Pt to the main product such that all the main product that is present in the extraction section is subjected to an enzymatic inactivation before being discharged through the first outlet. This way, the residence time of the main product, i.e. the puree, or the juice, at the extraction temperature is extremely short and is, therefore, avoided the possibility of having an early degradation of the product. Therefore, in this case, the enzymatic inactivation section coincides with the extraction section.

In an exemplary embodiment, the mixing means is adapted to withdraw the above described predetermined amount of hot product from the enzymatic inactivation section and to feed it in the extraction section in such a way to cause the enzymatic inactivation of only one part of the main product present in the extraction section. In this case, the flow of hot product causes a local enzymatic inactivation, substantially instantaneous, of only a predetermined amount of the main product before it is discharged from the extraction section through the first outlet. Then, the amount of the main product that has been submitted to the enzymatic inactivation into the extraction section is mixed with the amount of the main product excluded from the enzymatic inactivation transferring heat to it and, thus, cooling it. Therefore, in this case, the enzymatic inactivation begins into the extraction section, with the enzymatic inactivation of a predetermined amount of extracted product, and then it ends into a finishing section of the enzymatic inactivation that is arranged downstream of the extraction section. In particular, in the finishing section of the enzymatic inactivation an enzymatic inactivation is carried out of the amount of the main product that has not been subjected to the enzymatic inactivation in the extraction section. The mixture of main product extracted and enzymatically inactivated and of main product extracted and not enzymatically inactivated exiting from the extraction section through the first outlet has a temperature T1 comprised between the temperature of the product and the enzymatic inactivation temperature.

Advantageously, a storage section is provided comprising a storage reservoir containing a predetermined amount of main hot product at a temperature equal to, or higher than, the enzymatic inactivation temperature and therefore already enzymatically inactivated.

In particular, the storage section comprises, furthermore, a recirculation means that is arranged to provide a recirculation of hot product in a circuit comprising said storage reservoir.

Advantageously, the heating means comprises a feeding means in communication with said storage reservoir of said storage section, said feeding means arranged to withdraw a predetermined amount of said main hot product from said storage reservoir and to feed a flow of hot product in said extraction section, in said extraction section said main hot product being mixed with said main product obtaining a mixture that is at least in part enzymatically inactivated and that is discharged through the first outlet.

In particular, the feeding means is arranged to feed into said extraction section a flow of enzymatically inactivated product, i.e. of hot product, along a feeding direction d forming a predetermined angle α with a direction radial to the sieve.

Advantageously, the mixing means comprises a feeding means for feeding a flow of hot product in the extraction section along a feeding direction set between a direction that is normal to the sieve and a direction that is tangential to the sieve.

In particular, the flow of hot product can have a component that is opposite to the linear speed of the rotor in the feeding direction.

In an exemplary embodiment, the flow of hot product can have a component concurrent with the linear speed of the rotor in the feeding direction.

According to a further exemplary embodiment, the flow of hot product can be directed in at least two feeding directions one of which is concurrent with the linear speed of the rotor in said feeding direction and the other one that is opposite to the linear speed of the rotor in said feeding direction.

Advantageously, the feeding means of the hot product flowing in the extraction section comprises a distributor means that is external to the sieve, said distributor means being directed along to two feeding directions arranged like a Y with respect to one another, wherein a first direction has a component that is concurrent with the rotation direction of said sieve and another direction has a component opposite to the rotation direction of said sieve.

Advantageously, the distributor means comprises at least one elongated nozzle that is arranged to emit towards the sieve a "blade jet" which extends for all the length of the same sieve.

Advantageously, the distributor means comprises an array of nozzles directed towards the sieve.

In particular, the treatment section can be selected from the group consisting of:
  a softening section;
  a grinding section;
  a chopping section;
  a sifting section;
  a cutting section;
  or a combination thereof.

Advantageously, the extraction section comprises a rotor arranged to work in combination with a fixed sieve having a plurality of holes and that is, for example, mounted around the rotor, in such a way to separate the main product, which passes through the holes of the sieve, from the waste material that, instead, cannot pass through the holes of the sieve.

In particular, the extraction section comprises a rotor operated by a motor for rotating inside a sieve at a predetermined speed of rotation, said speed being such that said flow of hot product that is fed towards said sieve does not interfere with the extraction step.

Advantageously, a program means is provided that is arranged to adjust the thermal power Pt transferred by said mixing means to said main product present in said extraction section.

In particular, the program means is arranged to adjust the flow of hot product that is fed into the extraction section from the inactivation section, said flow being such that at least one part of the main product is at least partially, or completely, inactivated in said extraction section.

Advantageously, the enzymatic inactivation circuit is selected from the group consisting of:
  a circuit that is separated from said extraction station and that comprises a means for drawing a predetermined amount of hot product off from the circuit and for feeding a flow of hot product in the extraction section;
  a circuit in which said extraction station is inserted in such a way that all the flow of puree present in said circuit forms said flow of hot product that enters said extraction section.

Advantageously, the program means is arranged to adjust at least one of the following parameters of process:
  the flow of hot product that is fed into the extraction section;
  the flow of product exiting from the extraction section;
  the power that is supplied to the motor which operates the rotation of said rotor in said extraction section;
  or a combination thereof.

In particular, the program means is arranged to adjust the power supplied to the motor that operates the rotor of the extraction section responsive to the flow of hot product fed to the extraction section, in such a way to avoid any encumbrance to the extraction process.

According to another aspect of the invention, a method for the enzymatic inactivation of puree, or juice, obtained from vegetable or animal food, comprises the steps of:
  treating said vegetable food obtaining a treated product;
  extracting from said treated product a main product comprising the puree, or the juice, by means of a rotor and a sieve which comprises a plurality of holes, obtaining said main product, which is discharged through a first outlet, and a waste material, which is discharged through a second outlet;
  carrying out an enzymatic inactivation, downstream of said extraction section, by means of heating to transfer to said main product a predetermined thermal power Pt for causing an enzymatic inactivation at least in part of it;
  transferring, in said extraction section, a predetermined thermal power Pt to said main product, said transferring step causing an enzymatic inactivation at least in part of said main product before it is discharged from said extraction section through said first outlet, said step of transferring said predetermined thermal power Pt in said extraction section carried out mixing a predetermined amount of hot product with said main product, said hot product being obtained in said enzymatic inactivation section and fed into said extraction section.

In particular, the enzymatic inactivation is carried out in the extraction section immediately after the obtainment of the main product, or substantially contemporaneously to the extraction step of the main product.

Advantageously, the step of transferring said said predetermined thermal power Pt is carried out through a step of mixing said predetermined amount of hot product with said main product that is arranged near the sieve.

In particular, the step of mixing the hot product with the main product is carried out between the sieve and a containing wall that defines the extraction section, or directly on the surface of the sieve.

In particular, the treatment section can be selected from the group consisting of:
- a softening section;
- a grinding section;
- a chopping section;
- a sifting section;
- a cutting section;
- or a combination thereof.

BRIEF DESCRIPTION OF THE DRAWINGS

The invention will be now shown with the following description of an exemplary embodiment thereof, exemplifying but not limitative, with reference to the attached drawings in which.

DETAILED DESCRIPTION OF SOME EXEMPLARY EMBODIMENTS

Figure 1:
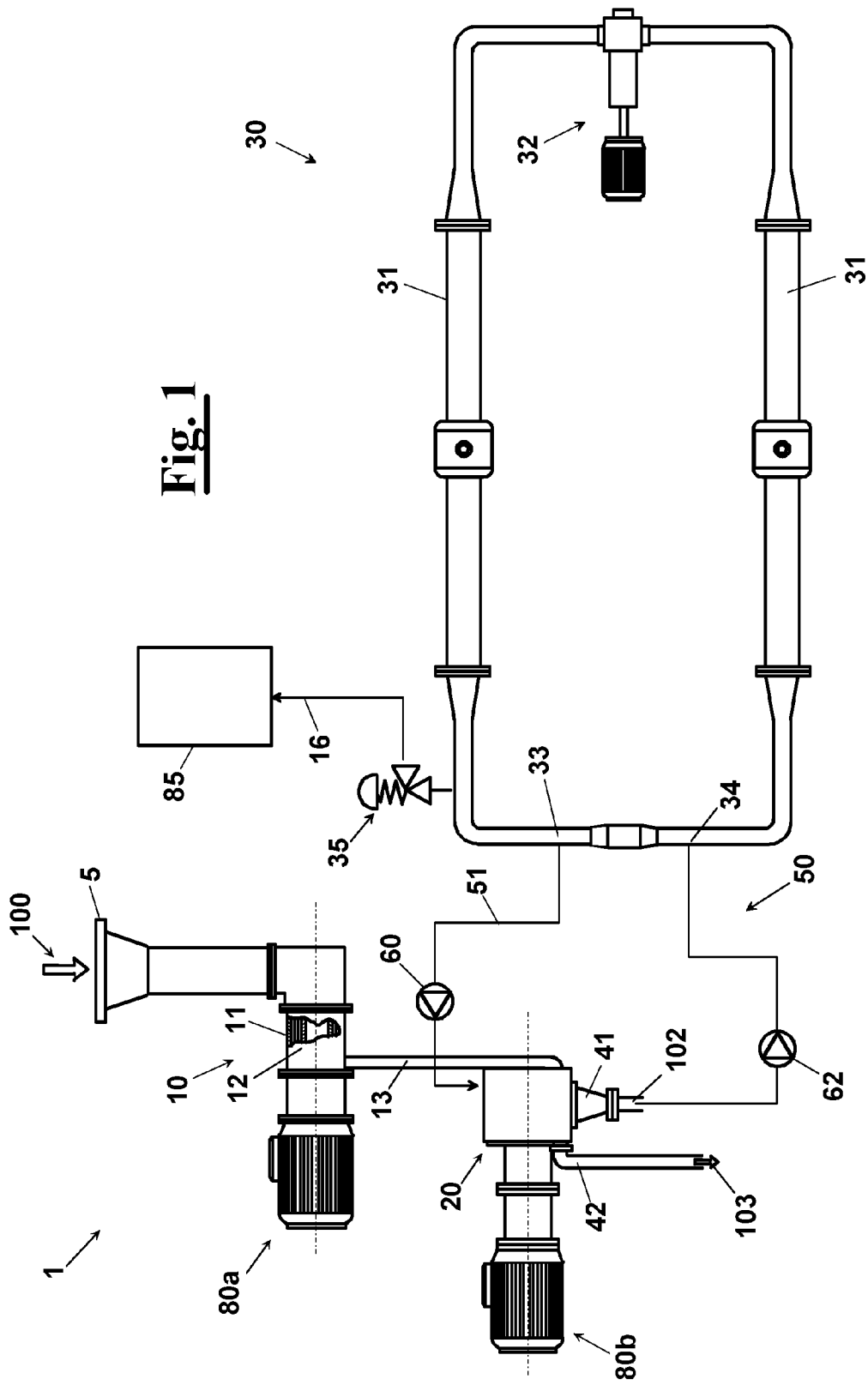
FIG. 1 diagrammatically shows a first exemplary embodiment of the apparatus, according to the invention, for enzymatic inactivation of puree, or juice, obtained from vegetable or animal food.

As diagrammatically shown in FIG. 1, an apparatus 1, for enzymatic inactivation of puree, or juice, from vegetable, or animal food, comprises a treatment section 10 of food 100 of vegetable, or animal, origin obtaining a treated product.

In an exemplary embodiment, the food product 100 to treat is fed to treatment section 10 by a hopper 5. Treatment section 10 can be, for example, a softening section comprising a rotor 11 that, operated by a motor 80a, applies, in combination with a stator 12 mounted around it, a plurality of pulses in quick succession on the starting product, as described for example in IT1249363.

In an exemplary embodiment, treatment section 10 can comprise a chopping section of the product 100, for example by means of rotating blades, or a grinding section. Alternatively, in treatment section 10, a means for causing a forced passage of the starting product 100 through a sieve can be provided, not shown in the figures, in such a way to obtain a first rough extraction. In a further exemplary embodiment, treatment section 10 can be a cutting section in which a cutting means operates.

In the case of FIG. 1, the treated product exiting treatment section 10 is directed, for example through a duct 13, towards an extraction section 20. Alternatively, extraction section 20 can receive the product 100 directly, i.e. without a preliminary passage of the same through a treatment section 10, for example in case of very soft food, or when the product 100 has been subjected to preliminary works into at least a section arranged upstream of extraction section 20.

Figure 2:
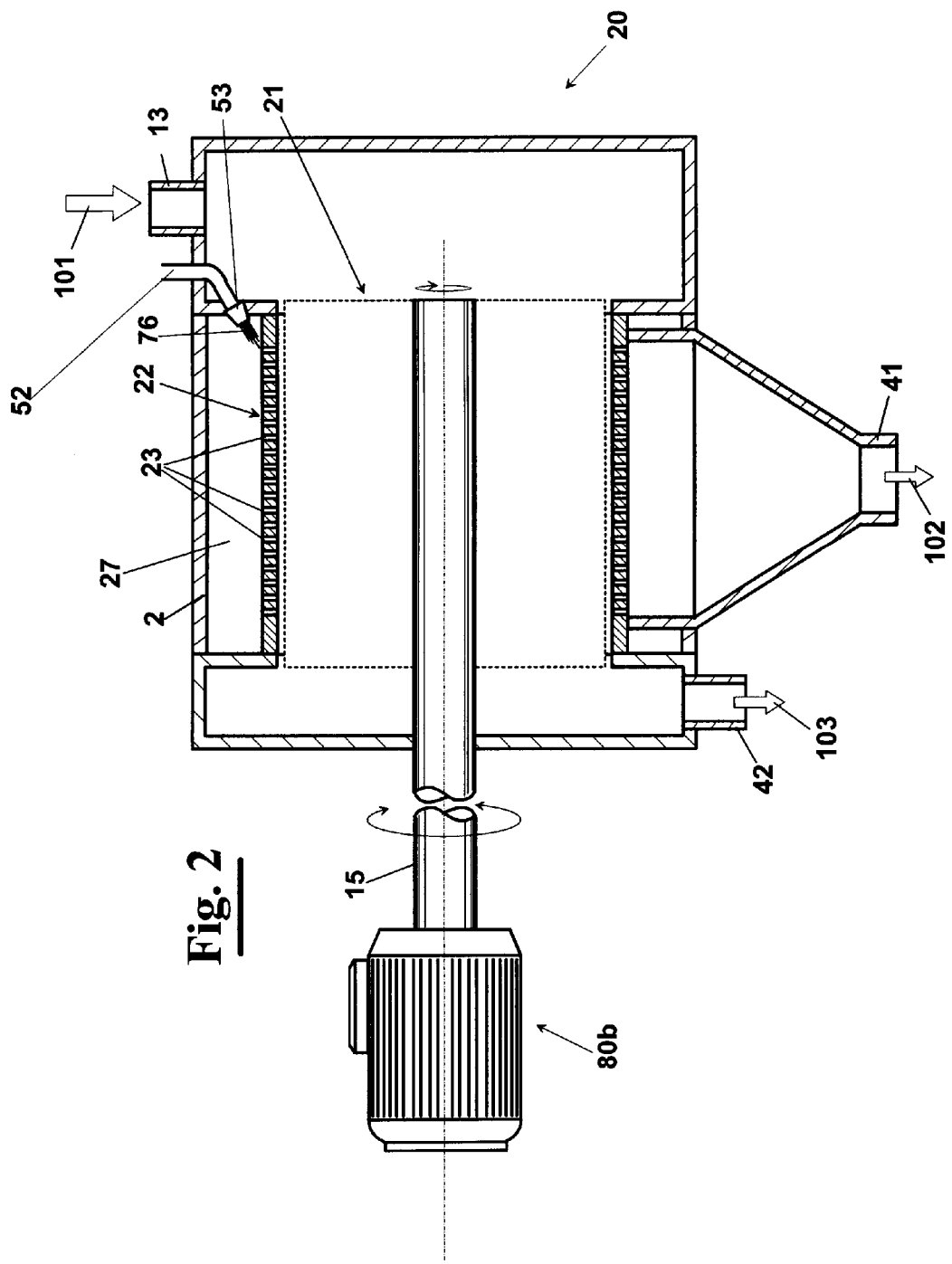
FIG. 2 diagrammatically shows a cross sectional view of the extraction section provided in the apparatus of FIG. 1 for highlighting the orientation of the feeding means of hot product towards the sieve.

As shown in detail in FIG. 2, extraction section 20 can comprise, for example, an extraction machine operated by a motor 80b in which the treated product 101 fed through the inlet 13 is separated into a main product 102 comprising the puree, or the juice, which is then discharged from extraction section 20 through an outlet duct 41, and into a waste material 103, which is discharged through an outlet duct 42.

Figure 3:
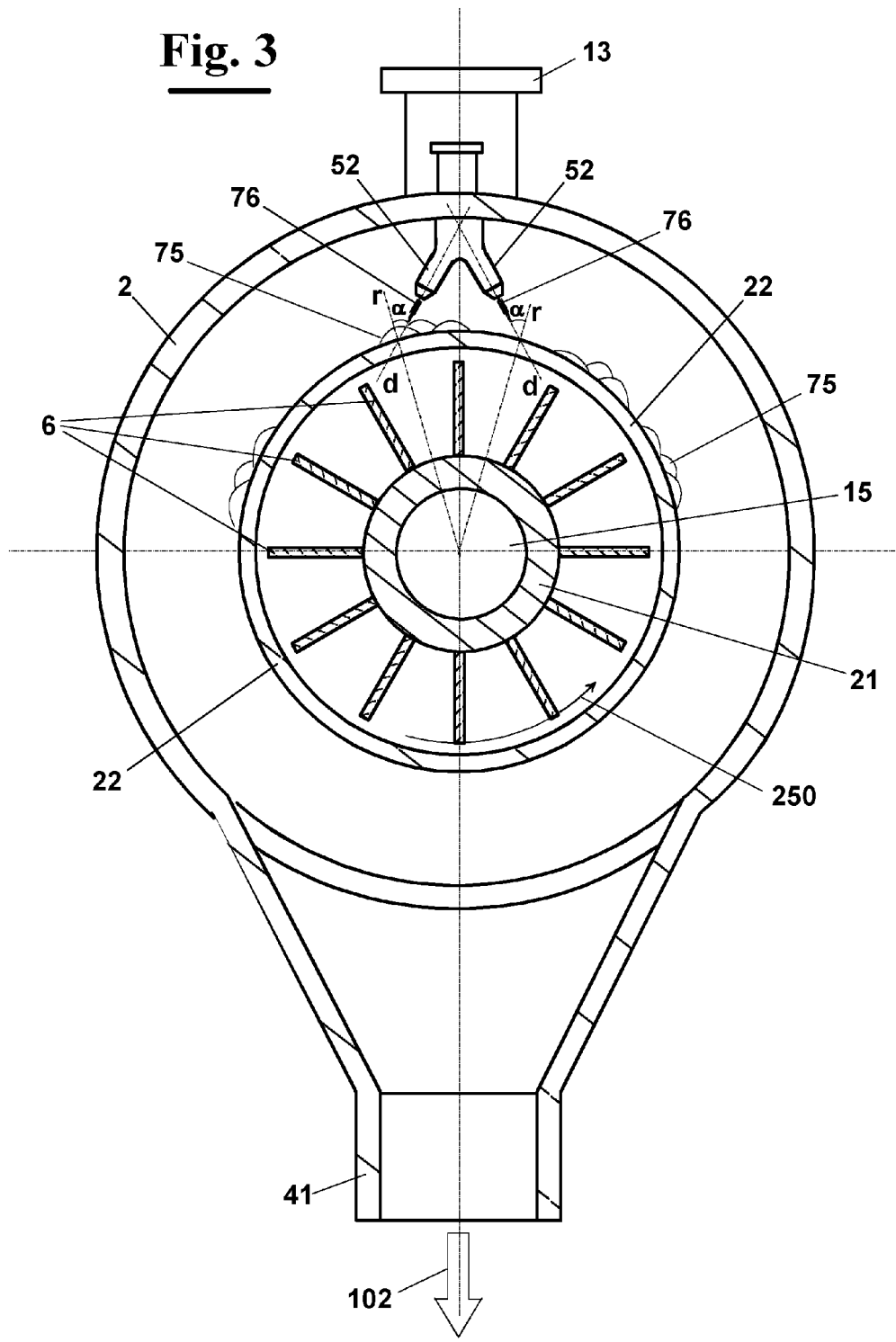
FIG. 3 diagrammatically shows an exemplary embodiment of the feeding means shown in FIG. 2.
Figure 4:
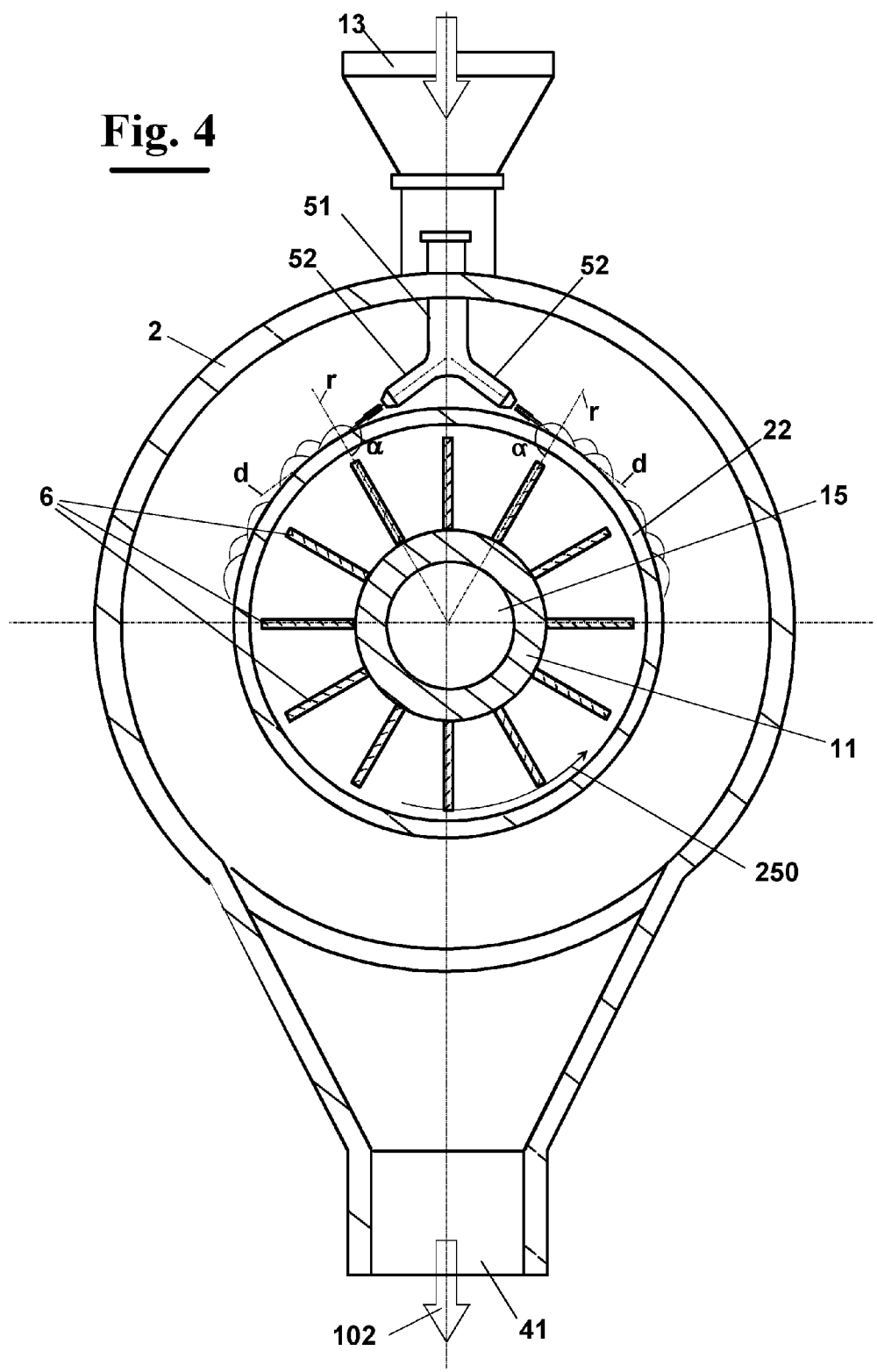
FIG. 4 diagrammatically shows another exemplary embodiment of the feeding means shown in FIG. 2.
Figure 5:
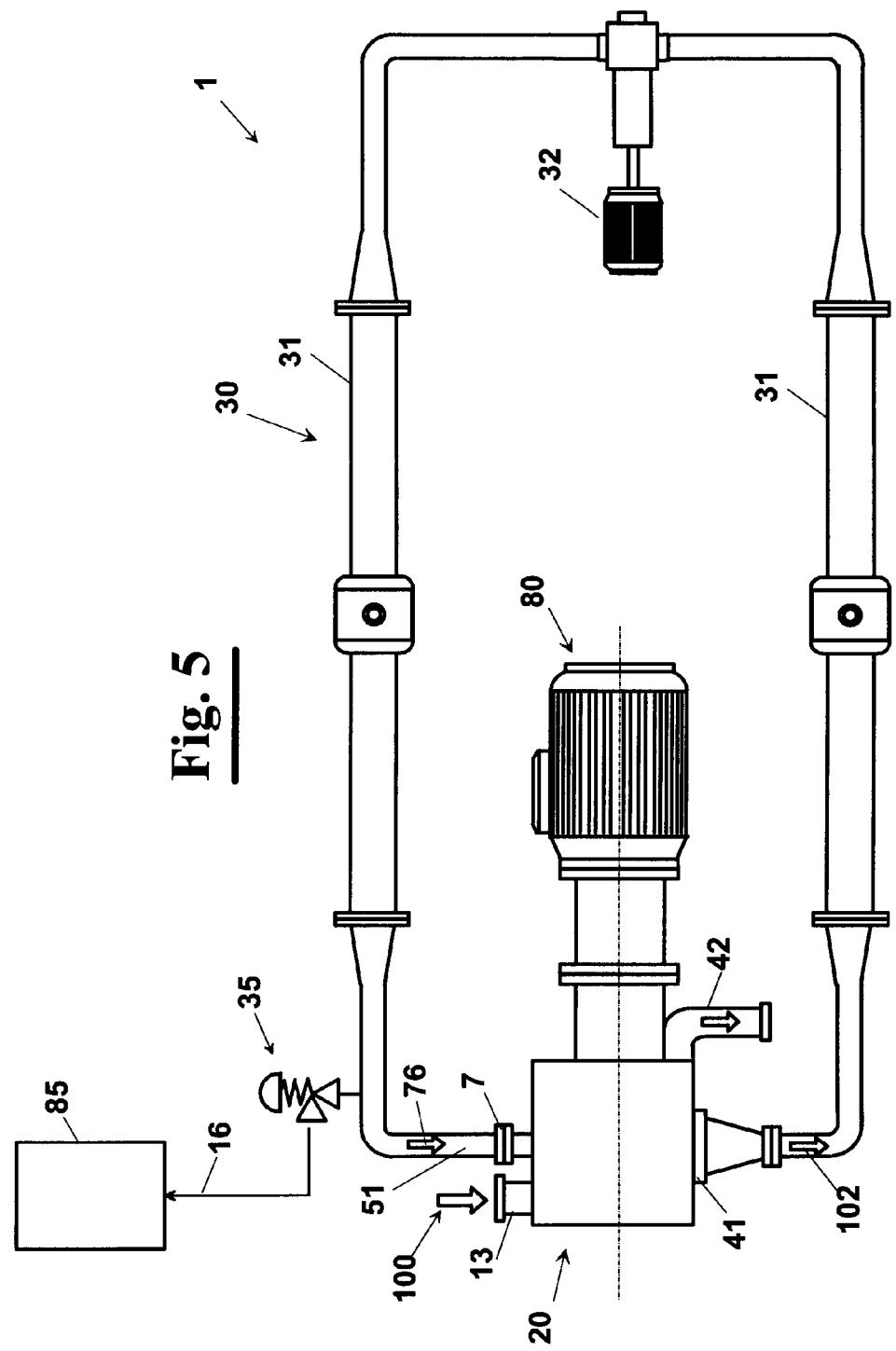
FIG. 5 shows an exemplary embodiment of the apparatus of FIG. 1.

In particular, as shown in FIG. 2, in extraction section 20 a rotor 21 is mounted that is put in rotation by means of a drive shaft 15 operatively connected to motor 80b. Rotor 21 is provided with blades 6 (as shown in FIGS. 3 and 4, and operates in combination with a fixed sieve 22 having a plurality of holes 23 and mounted around it for separating the product entering extraction section 20 into a main product comprising the puree, or the juice, which passes through sieve 22 and into a waste material that, instead, cannot pass through sieve 22 and is discharged through an outlet 42. More precisely, the treated product enters extraction section 20 at a temperature $T_0$. In particular, the temperature $T_0$ can be set between about $-25°$ C. and about $+30°$ C., for example To can be equal to the room temperature, i.e. about 20-25° C. Therefore, the extraction that is carried out is a cold extraction.

The apparatus 1 can comprise, furthermore, always with reference to FIG. 1, a storage and recirculation section 30, comprising, in particular, an enzymatic inactivation circuit crossed by a hot product at a temperature $T_2$, higher than the enzymatic inactivation temperature $T^*$ of the main product, i.e. of the puree, or the juice, coming from extraction section 20, normally equal to about 85° C-90° C. The product is kept at the temperature $T_2$ by at least one heat exchanger 31, and recirculated by means of a pump 32. Storage section 30 is such that the hot product remains in the activation circuit for a time that is long enough to provide its inactivation, and then it is discharged through a duct 16 into a reservoir 85, for being submitted to further steps not described here in detail. Alternatively, the storage section can be configured in a different way, for example it can be a reservoir, not shown in the figures. According to the invention, the main product present in extraction section 20 is struck, in extraction section 20 same, by a flow of hot product, i.e. hot puree and/or hot juice, coming from the enzymatic inactivation section 30 and fed into extraction section 20 by a mixing means, for example a feeding duct 51. More precisely, with reference to FIG. 2, near sieve 22, or directly on its surface, or in any case in extraction section 20, a distribution of a flow of hot product 76 is provided that joins the main product obtaining a mixture that is then discharged through outlet 41. The step of mixing the hot product at a temperature $T_2$ with the product at a temperature $T_o$ present in extraction section 20 is carried out, in particular, out of sieve 22 near it, or directly on its external surface. More in detail, the step of mixing the product at a temperature $T_2$ with the product at a temperature $T_o$ extracted in extraction section 20 is carried out in jacket 27 present between sieve 22 and the containing wall 2 that defines extraction section 20. In particular, the flow of hot product 76 and the flow of main product 102, i.e. the amount of the main product extracted in a unit of time, are in a predetermined ratio. More precisely, the ratio between the flow of hot product 76 and the flow of main product 102 is adjusted, for example adjusting the power absorbed by motor 80b, such that the thermal power Pt transferred during the step of mixing the two flows, which is carried out in extraction section 20, causes an enzymatic inactivation at least in part of main product 102 immediately downstream of sieve 22, or directly on its surface.

In the exemplary embodiment shown in FIGS. 1 and 2, the hot product 76 that recirculates in storage section 30 enters a duct 51 having an end portion 52 arranged in the extraction section 20. More in detail, end portion 52 has a distribution mouth 53 arranged near sieve 22, in order to feed the hot product 76 against sieve 22 along a feeding direction d forming a predetermined angle α with respect to the radial direction r (FIG. 3 or 4). More in detail, the end portion 52 of the feeding duct 51 supplies the flow of hot product 76 along a feeding direction set between a direction normal to sieve 22 and a direction tangential to sieve 22.

For example, the angle a can have an amplitude set between about 0°, in a way not shown, where the direction d is substantially normal to sieve 22, and about 90°, in this case the direction d is substantially tangential to sieve 22 (FIG. 4).

In particular, the hot product 76 fed towards sieve 22 along the feeding direction d has a thermal power Pt adapted to cause the enzymatic inactivation at least in part of the main product 75, before the mixture so obtained is discharged by extraction section 20 through outlet 41.

More precisely, once the main product has crossed the holes 23 of sieve 22 it is struck by the hot product 76 coming from the storage section 30, causing a local and substantially instantaneous enzymatic inactivation of the main product. The mixture so obtained in jacket 27 is then discharged from extraction section 20 through outlet 41 and fed to storage section 30 through a duct 53. The apparatus 1, according to the invention, achieves, therefore, substantially contemporaneously, a cold extraction and an enzymatic inactivation at least in part of the main product. The main product is then sent from extraction section 20 to a storage section 30 where the main product is recirculated in a circuit, in such a way to keep it at a temperature equal to, or higher than, the enzymatic inactivation temperature. The step of feeding of the hot product in extraction section 20 can be, for example, carried out by a pump 60.

In another exemplary embodiment, instead, the thermal power Pt of the hot product fed into extraction section 20 can cause the enzymatic inactivation of all the main product present between sieve 22 and the containing wall 2 before it is discharged through outlet 41.

As still shown in FIG. 1, rotor 11 of treatment section 10 and the rotor 21 of extraction section 20 can be operated independently by respective motors 80a and 80b. Alternatively, treatment section 10 and extraction section 20 can be arranged adjacent to the respective rotors operated by a single motor, in a way not shown in the figures. Such configuration allows, in particular, to provide an apparatus 1 of small dimensions and to use only one motor for operating both treatment section 10 and extraction section 20 therefore providing a high energy saving.

In the exemplary embodiment of FIG. 1, the feeding means 50 comprises a feeding duct 51 through which a predetermined amount of hot product at the temperature T2 is sent. As disclosed above and shown in FIG. 3 or 4, the duct 51, at extraction section 20, has at least one end portion 52 shaped as a nozzle inclined of a predetermined angle α with respect to the radial direction r of sieve 22, in such a way to feed the hot product along a feeding direction d. The angle α can have, normally, an amplitude set between 0° and 90°, i.e. set between a direction normal to the sieve or tangential to the sieve.

Storage section 30 provides a counter-pressure valve 35 for discharging the puree, the valve balancing the pressure in storage section 30 same and through which the hot product is sent to storage station 85.

As shown in FIG. 1, rotor 11 of treatment section 10 and rotor 21 of extraction section 20 can be operated independently from respective motors 80a and 80b. In another exemplary embodiment of the invention, instead, treatment section 10 and extraction section 20 can be arranged adjacent to the respective rotors operated by a single motor 80, in a way not shown in the figures. Such configuration, allows in particular to provide an apparatus 1 of small dimensions and to use a single motor 80 for operating both treatment section 10 and extraction section 20, with a subsequent high energy saving.

Figure 6:
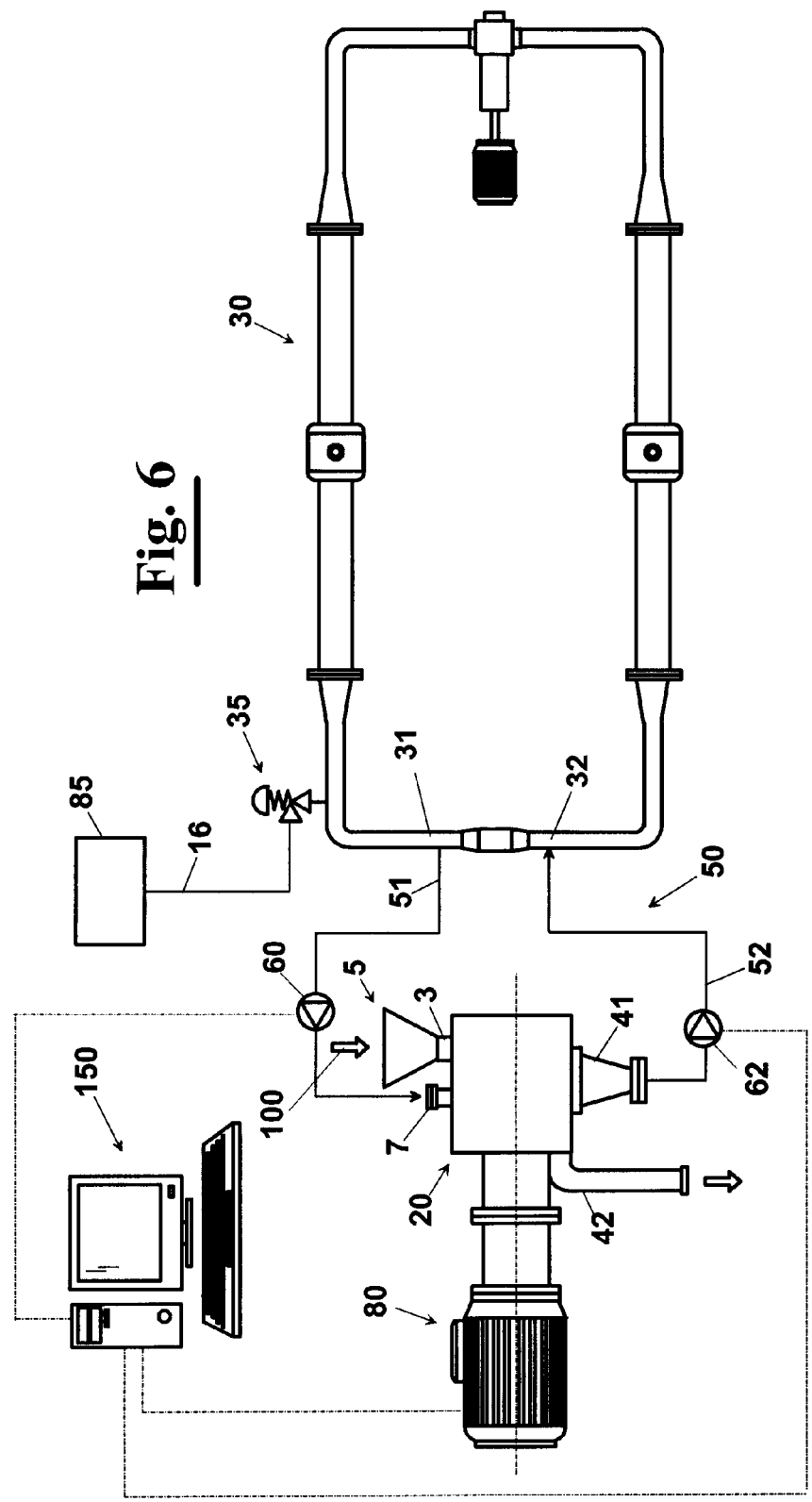
FIG. 6 shows a further exemplary embodiment of the apparatus of FIG. 1.

In a further exemplary embodiment, as diagrammatically shown in FIG. 6, a program means is provided 150 that is arranged to adjust some process parameters to ensure that in extraction section 20 at least one partial enzymatic inactivation of main product 102 is obtained. For example, program means 150 can adjust the flow of hot product 76 withdrawn from the enzymatic inactivation section and delivered to extraction section 20, and/or the flow of product 102 exiting extraction section 20 and/or the power supplied to motor 80b that causes the rotation of rotor 21. This way, it is possible to adjust the flow of hot product 76 and then the thermal power Pt transferred from it to main product 102 in extraction section 20 at the outer surface of sieve 22.

In a possible embodiment, given a predetermined thermal power Pt, calculated in such a way to cause, for example, the enzymatic inactivation of product 102 at sieve 22, program means 150 adjusts the power supplied to motor 80b for increasing, or decreasing, the flow of extracted product 102 in such a way that the hot product fed outside sieve 22 does not interfere with the extraction process.

The foregoing description of a specific embodiment will so fully reveal the invention according to the conceptual point of view, so that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realise the different functions described herein could have a different nature without, for this reason, departing from the field of the invention. It is to be understood that the phraseology or terminology employed herein is for the purpose of description and not of limitation.

The invention claimed is:

1. An apparatus for enzymatic inactivation of puree, or juice, obtained from vegetable or animal food, the apparatus comprising:
    a treating section for treating said vegetable or animal food, obtaining a treated product;
    an extraction section comprising a rotor that works in combination with a fixed sieve provided with a plurality of holes and that is mounted around the rotor, such that the rotor, during rotation of the rotor, pushes the treated product against the sieve separating the treated product into a main product comprising said puree, or juice, which passes through the holes of the sieve and is discharged through a first outlet, and into a waste product that, instead, cannot pass through the holes of the sieve and is discharged through a second outlet;
    an enzymatic inactivation section arranged downstream of said extraction section and comprising a heat exchanger for transferring a predetermined thermal power to said main product for causing an enzymatic inactivation of said main product; and a means for causing at least a beginning of said enzymatic inactivation inside of said extraction section, said means for causing being capable of transmitting the predetermined thermal power to said main product so that the enzymatic inactivation of said main product begins before discharging the main product from said extraction section through said first outlet;

wherein said means for causing comprises a mixing means provided with at least one feeding duct for delivering a flow of a predetermined amount of hot product coming from said enzymatic inactivation section into said extraction section, the flow of predetermined amount of hot product being associated to the predetermined thermal power; and wherein said mixing means further comprises a controller that is capable of withdrawing said predetermined amount of hot product from said enzymatic inactivation section, and of feeding the flow of predetermined amount of withdrawn hot product into said extraction section through the at least one feeding duct.

2. The apparatus according to claim 1, wherein said hot product is provided in said extraction section in the predetermined amount of hot product, and said main product is provided in said extraction section in a predetermined amount of said main product, such that the exchange of thermal power that is carried out during their mixing causes an enzymatic inactivation, at least in part of said main product.

3. The apparatus according to claim 1, wherein said flow of hot product put in said extraction section and the flow of main product, namely, the amount of said main product extracted in a unit of time, are in a predetermined ratio, such that the exchanged thermal power causes an enzymatic inactivation at least in part of said main product.

4. The apparatus according to claim 1, wherein the controller is capable of withdrawing said predetermined amount of hot product from said enzymatic inactivation section, and of feeding the flow of the predetermined amount of withdrawn hot product into said extraction section through the at least one feeding duct, in such a way to cause the enzymatic inactivation of only one part of the main product present in the extraction section.

5. The apparatus according to claim 1, wherein the at least one feeding duct feeds said flow of the predetermined amount of hot product onto the surface of said sieve, in order to transfer said predetermined thermal power to said main product inside of said extraction section and outside of said sieve, or directly on the surface of said sieve.

6. The apparatus according to claim 1, wherein the at least one feeding duct feeds the flow of hot product inside of said extraction section along a feeding direction set between a direction normal to the sieve and a direction tangential to the sieve.

7. The apparatus according to claim 6, wherein the rotor has a direction of rotation, and wherein the flow of hot product has a component opposite to the direction of rotation of the rotor in said feeding direction.

8. The apparatus according to claim 6, wherein the rotor has a direction of rotation and the flow of hot product is a flow that has a component concurrent to the direction of rotation of the rotor in said feeding direction.

9. The apparatus according to claim 6, wherein the rotor rotates in a direction of rotation, and the feeding duct is capable of feeding the flow of hot product in at least first and second feeding directions, wherein said first feeding direction is concurrent with the direction of rotation of the rotor in said first feeding direction, and wherein said second feeding direction is opposite to the direction of rotation of the rotor.

10. The apparatus according to claim 1, wherein said at least one feeding duct is external to said sieve, and directed according to two directions of feeding arranged like a Y with respect to one another, one first direction having a component concurrent with the rotation direction of said rotor and another direction having a component opposite to the rotation direction of said rotor.

11. The apparatus according to claim 10, wherein the at least one feeding duct comprises an end portion shaped as a nozzle which emits a blade jet of hot product towards the sieve, wherein the blade jet extends for a length of said sieve.

12. The apparatus according to claim 10, wherein the at least one feeding duct comprises a plurality of nozzles.

* * * * *